United States Patent [19]
Martensson

[11] Patent Number: 5,151,946
[45] Date of Patent: Sep. 29, 1992

[54] VARIABLE CONFIGURATION PORTABLE TELEPHONE

[75] Inventor: Nils E. Martensson, Woking, England

[73] Assignee: Technophone Limited, Surrey, England

[21] Appl. No.: 841,264

[22] Filed: Feb. 24, 1992

Related U.S. Application Data

[63] Continuation of Ser. No. 568,349, Aug. 15, 1990, abandoned.

[30] Foreign Application Priority Data

Aug. 24, 1989 [GB] United Kingdom ............... 8919215

[51] Int. Cl.⁵ .......................................... H04M 11/00
[52] U.S. Cl. ........................................ 379/38; 379/59; 379/433; D14/138
[58] Field of Search .................. 379/58, 59, 61, 63, 379/370, 419, 420, 425, 428, 429, 433, 434, 440; D14/137, 138, 140, 147, 148, 247, 248

[56] References Cited

U.S. PATENT DOCUMENTS

| | | | |
|---|---|---|---|
| 4,056,696 | 11/1977 | Meyerle et al. | 179/100 R |
| 4,251,696 | 2/1981 | MacKenzie et al. | 179/103 |
| 4,621,373 | 11/1986 | Hodsdon | 379/63 |
| 4,782,522 | 11/1988 | Kramer et al. | 379/419 |
| 4,790,007 | 12/1988 | Richter et al. | 379/420 |

FOREIGN PATENT DOCUMENTS

| | | | |
|---|---|---|---|
| 3309832 | 9/1984 | Fed. Rep. of Germany | 379/61 |
| 3323858 | 1/1985 | Fed. Rep. of Germany | 379/61 |
| 2058516A | 4/1981 | United Kingdom . | |
| 2158328 | 11/1985 | United Kingdom | 379/61 |

Primary Examiner—James L. Dwyer
Assistant Examiner—Dwayne D. Bost
Attorney, Agent, or Firm—Perman & Green

[57] ABSTRACT

A compact portable telephone comprises a housing having a main body and an extending sleeve-like portion mounted for longitudinal slidable movement between a retracted position when not in use (see FIG. 2), and an extended position (see FIG. 1) for use. In a preferred arrangement, the earphone is present in the main body and the microphone is in the extending portion. The telephone includes a plurality of buttons or keys which can be selectively actuated for operating the telephone, and in one embodiment the extending portion is adapted to conceal selected ones of the buttons or keys when it is in the closed position to prevent accidental actuation of these buttons or keys.

28 Claims, 4 Drawing Sheets

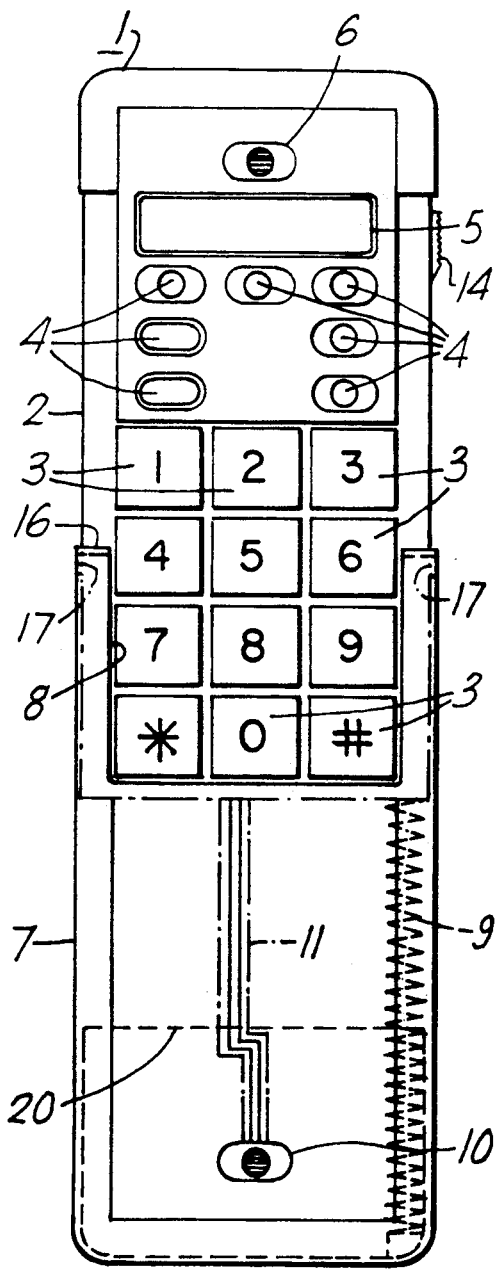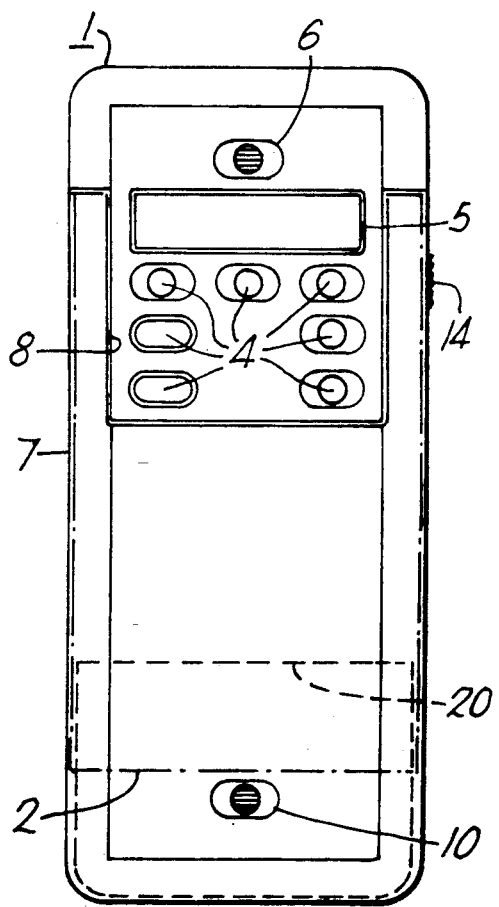

VARIABLE CONFIGURATION PORTABLE TELEPHONE

This is a continuation of copending application Ser. No. 07/568,349 filed on Aug. 15, 1990 (Abandoned).

This invention relates to a portable telephone, more particularly, a compact hand-held radio telephone.

Background of the Invention

There is a tendency nowadays for portable radio telephones to become increasingly lightweight and compact. However, as overall dimensions generally decrease, it has to be borne in mind that there is a critical minimum dimensional constraint on the separation of the microphone and the earphone imposed by the distance between the ear and the mouth of the human head, typically 15 cm.

The US Motorola Corporation has recently launched a particularly compact portable cellular radio telephone, model No. 9800X, which comprises a main body and a hinged flap-like member housing the microphone. When the telephone is not in use, the hinged flap is folded flat against the main body of the telephone. In the folded position, the overall length of the telephone is only 16.2 cm approximately. In use, the flap is pivoted manually into an open position thereby establishing the optimum spacing between the earphone and the microphone for convenient use.

However, it is a disadvantage of that telephone that the hinged flap in which the microphone is contained is a light-weight, relatively flimsy member, which is prone to damage particularly when the microphone flap is open for use since it is then extremely susceptible to accidental knocks or other rough treatment. The hinged flap arrangement also presents the difficulty of implementing a reliable conductive path from the microphone to the main body of the telephone across the hinge. Furthermore, the hinged flap design does not lend itself readily to automation of the opening and closing mechanism.

Outside the area of portable (cordless) radio telephones, instruments are known which can be retracted when not in use. For example, U.S. Pat. No. 4,251,696 discloses a conventional fixed wire telephone instrument comprising three distinct housings. A first housing, which encloses an earphone, is secured to a second housing containing a dialer assembly. A third housing, enclosing a microphone, is slidably mounted within the first and second housings. Hence the second housing can be retracted when the telephone is not in use and extended for use.

U.S. Pat. No. 4,056,696 discloses a mobile radiotelephone (i.e. for installation within a vehicle) which includes a handset which is hard-wire connected to a control panel of the telephone. In this case the handset includes a telescoping bridge portion so that the handset can be stored in a retracted position, but extended to an open position for use.

However the two prior art references cited above do not relate to a stand-alone self-contained portable (cordless) radio telephone and in neither case does the telephone housing enclose a transceiver.

Summary of the Invention

According to the present invention there is provided a portable radio telephone comprising a housing enclosing transceiver means, said housing having a main body and an extending portion mounted for longitudinal slidable movement between a first position at which the main body and the extending portion are in a substantial overlapping relationship and a second position at which the extending portion extends from the main body, first transducer means being present in the main body and second transducer means being present in the extending portion.

In contrast with the prior art portable telephone with a hinged flap-like member discussed above, a portable telephone in accordance with the invention has the advantage that it enables the overall design to be both compact and relatively robust.

Furthermore, electrical connection from the transducer means in the extending portion to circuitry in the main body can be implemented in a reliable and straightforward manner. In one embodiment, for example, this connection is achieved using a flexible connector, especially a flexible printed circuit.

In a preferred embodiment, the first transducer means is an earphone and the second transducer means is a microphone. Thus it is the microphone, which is generally smaller and consumes less power than the earphone, which is provided in the extending portion. This is an advantageous configuration also because it is usual to have an antenna mounted close to the earphone. The provision of the antenna on the main body, rather than on the extending portion, avoids the need for a flexible connector to the antenna.

Preferably the housing comprises a plurality of buttons or keys which can be selectively actuated for operating the telephone, and the extending portion is adapted to conceal at least some of the buttons or keys when it is in the first position. Thus when the telephone is not in use the extending portion prevents the concealed keys from being actuated accidentally. Furthermore, this arrangement enables the telephone to have a much more aesthetically pleasing design and offers the advantage of operational synergy when opening or closing communication.

In a particular embodiment the extending portion houses a battery for powering the telephone. The battery is usually a relatively heavy unit, and this arrangement has the advantage of distributing the weight over the whole telephone so that it has a balanced feel rather than being top heavy when in use.

Suitably the movement of the extending portion from the first position to the second position automatically produces an off-hook condition. Thus, for example, a simple switching means may be incorporated in the housing which produces the off-hook condition when the extending portion is moved to its second, extended position. To initiate an outgoing call the subscriber would be required to press an appropriate "SEND" button or key on the telephone main body, in the usual way. However, closing the extending portion to the first, retracted position will automatically produce the on-hook condition and so terminate a call in either the call receive or call send modes.

In one embodiment, means are provided which bias the extending portion towards the second, open position. Releasable locking means are included for retaining the extending portion in the first, retracted position, thus by releasing the locking means the extending portion will move automatically to the second, fully extended position. Alternatively, the extending portion may be driven by a motor actuated by a button or key on the outside of the housing.

Embodiments of the invention will now be described, by way of example, with reference to the accompanying drawings in which:

Brief Description of the Drawings

FIG. 1 is a plan view of a portable telephone in accordance with the invention showing the extending portion in the fully extended position, FIG. 2 is a plan view of the telephone in FIG. 1 showing the extending portion in the retracted position.

In the Figures, corresponding parts are denoted by the same reference numerals.

DETAILED DESCRIPTION OF THE INVENTION

Figure 3:
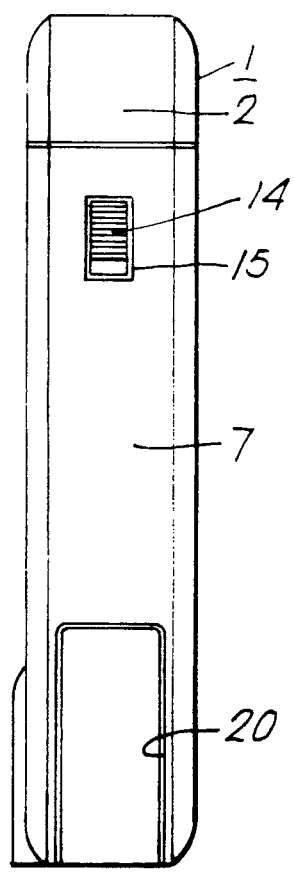
FIG. 3 is a side elevation of the telephone in FIG. 2 with the extending portion in the retracted position.

A hand portable cellular radio telephone is shown in FIGS. 1-3, which comprises a housing 1 having a main body 2 enclosing substantially the whole of the electronic circuitry of the telephone, as discussed in more detail below. The housing may be made of a plastics material, typically 2 mm thick, or of a metal such as satin anodized aluminium whose thickness may be less than 0.5 mm.

Included on the housing 1 are a first group of keys or buttons 3 labelled 1-9, 0, *, and # arranged in an array of four rows and three columns, as is usual; and a second group of control keys or buttons 4 for selecting various predetermined functions such as memory storage, last number redial, call start (e.g. labelled "SEND"), etc, again as is usual. Within the housing 1 above the two groups of keys 3 and 4 there is a display panel 5, suitably a liquid crystal display for presenting information to the user, in conventional manner. Above the display 5 the main body 2 has a grille 6 behind which is mounted an earphone.

The housing 1 additionally comprises a sleeve-like portion 7 slidably mounted on the main body 2. The sleeve 7 has a U-shaped cut-out window portion 8 arranged so that all of the keys 3 and 4 are exposed when the sleeve is in its fully extended position as shown in FIG. 1. When the sleeve 7 is retracted to its closed position, however, it covers the first group of keys 3, but leaves the second group of keys 4 exposed through the window 8 (see FIG. 2). Hence, when the telephone is not in use and the sleeve 7 is closed (retracted) the control keys 4 can still be selected, but the numeric keys 3 cannot. The numeric keys 3 are thus protected from accidental actuation when the telephone is not in use.

Figure 4A:
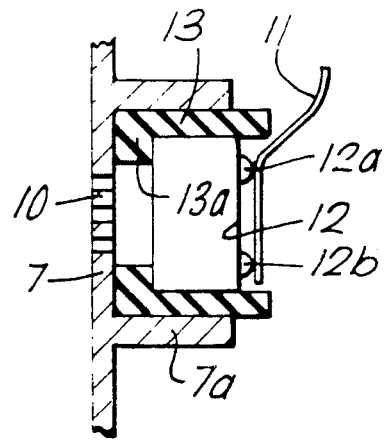
FIG. 4a is a cross-section showing a detail of the microphone mounting in the telephone of FIGS. 1-3.
Figure 4B:
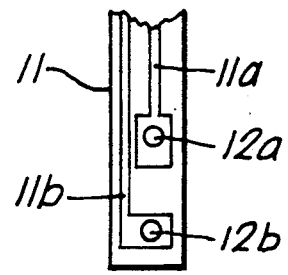
FIG. 4b is a plan view of a printed circuit for connecting to the microphone of FIG. 4a, FIG. 5 is a cross-section showing a detail of the main body and the extending portion of the telephone.

The sleeve 7 has a grille 10 towards its lower end behind which is mounted a microphone 12. As shown in FIG. 4a, the microphone 12 is fitted within a tube 13 of compressible material, eg. rubber, having flange 13a against which the front face of the microphone 12 abuts. The rubber tube 13 is push-fitted into a collar 7a formed integrally on the inside of the sleeve 7. The microphone 12 has two electrical contacts 12a and 12b on its rear side to which electrical connection is made by a flexible connector 11. The flexible connector is ideally a flexible printed circuit having a pair of conductive tracks 11a and 11b on a flexible substrate made of, for example a polyimide material, such as KAPTON (Trade Mark). A suitable track configuration for the flexible printed circuit is shown in FIG. 4b in which the two narrow tracks 11a and 11b open into larger area contact portions in the vicinity of microphone contacts 12a and 12b respectively. The microphone 12 is thus connected to the audio circuitry in the main body 2 of the telephone.

It is noted here that the microphone 12 may be connected to the audio circuitry by alternative means, such as conductive tracks present on the inside surface of the sleeve 7, a corresponding contact being provided in the main body 2 whereby the conductive track on the sleeve is arranged to provide sliding contact with the contact in the main body.

The sleeve 7 fits snugly round the main body 2 of the housing 1 such that only relatively gentle pressure is required to slide the sleeve relative to the main body 2. The sleeve 7 may simply bear against the main body 2 or additional bearing members may be incorporated to improve the sliding action. For example, an outwardly biased leaf spring (not shown) may be fastened to each side of the main body 2 so that the sleeve bears against the leaf spring surfaces rather than the sides of the main body 2; the leaf springs also being effective to take up any tolerance between the sleeve 7 and the main body 2.

As shown in FIG. 1, a coil spring 9 is fixed between the bottom of the main body 2 and the internal bottom surface of the sleeve, which acts to bias the sleeve 7 into the open, fully extended position.

A locking mechanism in the form of an outwardly biased button 14 is provided on a side wall of the main body 2, which button is arranged to fit into a complementary aperture 15 on the side wall of sleeve 7 (see FIG. 3) when the sleeve 7 is moved to the closed (retracted) position. Thus, simply by depressing the release button 14, the sleeve 7 will move automatically to the fully extended position under the action of spring 9.

After use, the sleeve 7 is pushed back by the user against the force of the spring 9, to the closed position where the button 14 engages in the aperture 15 and so locks the sleeve 7 in the retracted position. It is noted here that the microphone 12 remains connected to the audio circuitry in the main body 2 of the telephone at all times, despite the sliding motion, by virtue of the flexible connector 11. In the retracted position, the flexible connector 11 simply folds ups within the sleeve 7.

Figure 5:
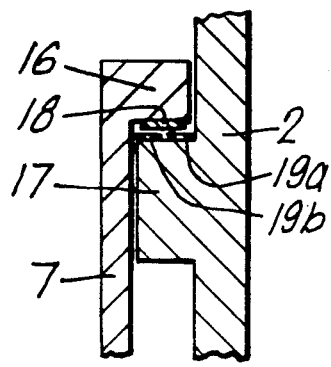

Movement of the sleeve 7 is arrested at the fully extended position when a lip 16 on the internal top edge of sleeve 7 abuts a flange 17 provided integrally on the main body 2, as shown most clearly in FIG. 5.

When the power is switched on the telephone is at all times capable of indicating (visually or audibly) when an incoming call is being addressed to the telephone. However, it is preferable for the user not to be able to answer an incoming or make an outgoing call, i.e. the telephone is in the so-called "on hook" condition, when the telephone is in its retracted position. To this end a simple switching mechanism may be incorporated as illustrated in FIG. 5. A contact 18 on the underside of lip 16 of sleeve 7 bridges a pair of contacts 19a and 19b on the top surface of the flange 17 of main body 2, but only when the sleeve 7 is in its fully extended position. Making the connection between contacts 19a and 19b enables the call answer/send mode (i.e. the telephone is "off hook") and breaking this connection disables the call answer/send mode (i.e. the telephone goes on hook). Hence, the telephone can only be used for making or answering a call when the sleeve is in its fully extended position. The action of closing the sleeve, after using the telephone, will therefore have the effect of terminating the call (regardless of whether it is an outgoing or incoming call). It is noted that since this present embodiment relates to a cellular telephone, an additional user operation may also be required to place a call, i.e. after entering the telephone number to be dialled, a SEND key (included among the control keys 4) may need to be depressed to activate the transmitter and to complete the call.

In the present embodiment a replaceable rechargeable battery 20 for powering the telephone is accommodated within the lowermost part of the sleeve 7. The battery 20 is relatively heavy and inclusion within the sliding sleeve has the beneficial effect of shifting the centre of gravity down the telephone towards the microphone as the sleeve 7 is extended for use. This results in the telephone having a balanced rather than a top-heavy feel. As shown in FIG. 2 the uppermost part of the battery 20 extends into a cavity within the main body 2 of the housing 1 when the sleeve 7 is in its retracted position.

Figure 6:
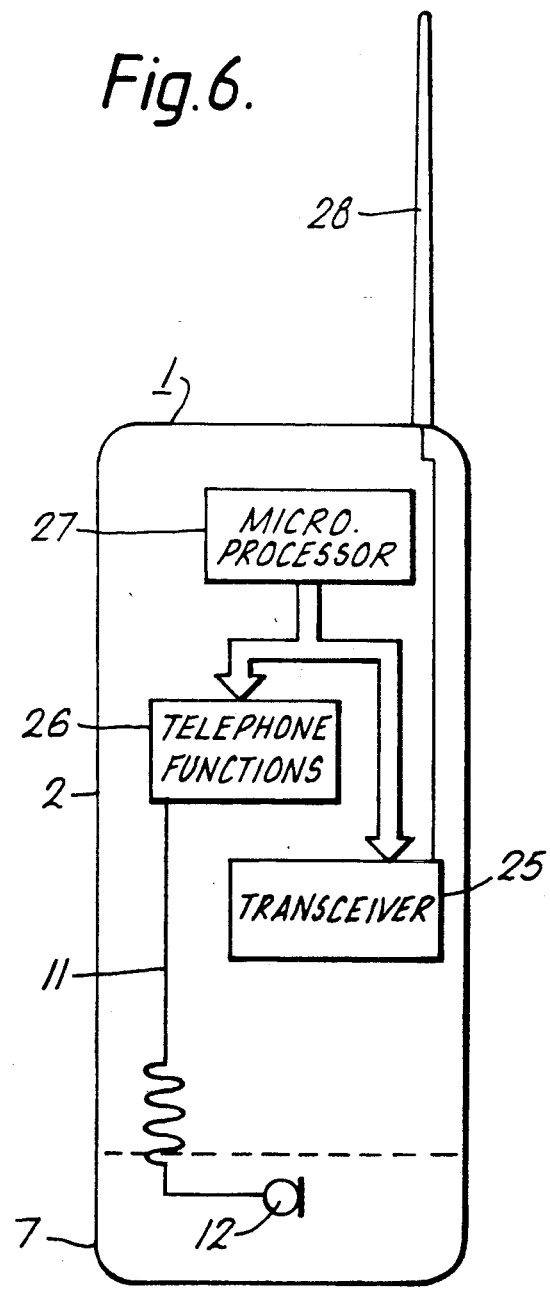
FIG. 6 is a schematic block diagram showing the internal configuration of the telephone in FIG. 2.

The main body 2 of the telephone encloses a transceiver 25 and all the necessary electronics 26 associated with telephone functions conventionally found in a cellular telephone, as shown schematically in FIG. 6. A microprocessor 27 is also included to control all the basic functions of the telephone and to control the keypad and display functions, as is usual. Compact cellular telephone modules suitable for inclusion in the present telephone housing 1 are themselves already well-known in the art and indeed are commercially available, for example, such a compact module is used in the Applicant's handportable cellular telephone marketed in the UK as the TECHNOPHONE TP2 (Trade Mark), and hence no further details will be given here.

The telephone would also include an antenna, typically a fixed external antenna 28 extending from the top of the housing in the vicinity of the ear piece. On the other hand, the antenna may be a retractable version which may be arranged to extend automatically when the sleeve 7 is extended for use. A manually extendible tape antenna suitable for this purpose is disclosed, for example in our U.S. Pat. No. 4,920,352. Alternatively, the antenna need not physically extend from the telephone but may, for example, be embedded in or otherwise attached to the material of the housing 1.

Figure 7:
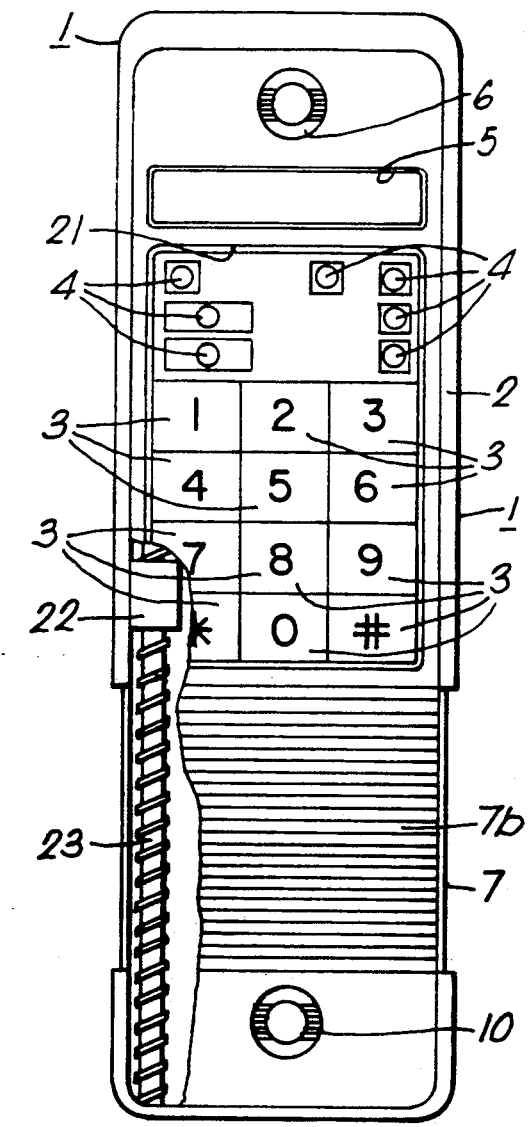
FIG. 7 is a partly cut-away plan view of a different portable telephone in accordance with the invention showing the extending portion in the fully extended position.
Figure 8:
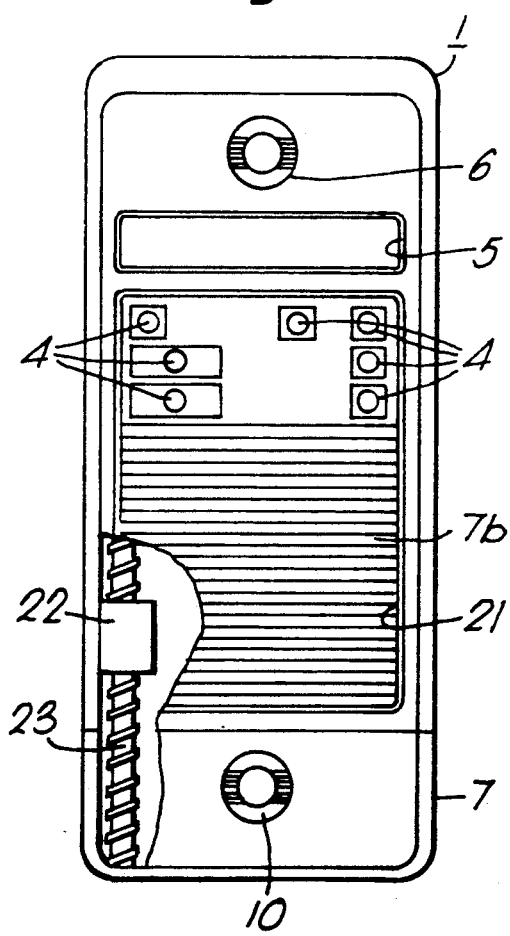
FIG. 8 is a partly cut-away plan view of the telephone in FIG. 6 with the extending portion in the retracted position.

A different telephone in accordance with the invention is illustrated in FIGS. 7 and 8. In this embodiment the sleeve 7 is mounted to slide inside the main body 2. However, the main body 2 comprises a window 21 exposing the buttons or keys 3 and 4. The front face 7b of sleeve 7 is arranged to slide directly beneath the window 21 to conceal the buttons or keys 3 when the sleeve is in the retracted position as shown in FIG. 8.

Also, in this case the sleeve 7 is driven under the action of a motor 22 mounted within the main body 2. The motor turns, via a worm wheel (not shown), a screw 23 which is fastened rotatably to the bottom of the sleeve 7. Thus the sleeve is opened and closed as the screw 23 is driven back and forth by the motor 22. The motor mechanism may be actuated by depressing a pre-determined one of the buttons or keys 4 which may be suitably labelled.

In view of the foregoing description it will be evident to a person skilled in the art that various modifications may be made within the scope of the invention defined in the following claims. For example, rather than leaving selected keys exposed when in the retracted state, the sleeve 7 may alternatively cover all of the keys and so prevent their accidental actuation.

Finally, it is noted that the invention is not limited to portable radiotelephones operable on conventional cellular radio telephone systems, but applies also to a portable cordless telephone operable for example on the discrete area system known in the UK as Telepoint or CT2, or on the proposed 1.8 GHz Personal Communications Network systems.

I claim:
1. A portable radio telephone comprising:
transceiver means,
a housing enclosing said transceiver means, said housing having a main body and an extending portion mounted for longitudinal slidable movement between a first position at which the main body and the extending portion are in a substantial overlapping relationship and a second position at which the extending portion extends from the main body,
first transducer means present in the main body;
second transducer means present in the extending portion;
and a keypad which comprises a plurality of keys which can be selectively actuated for operating the telephone, wherein the extending portion comprises a window through which at least one of the keys is accessible when the extending portion is in the first position.

2. A portable radio telephone as claimed in claim 1, wherein the main body of the housing encloses the transceiver means.

3. A portable radio telephone as claimed in claim 1, or claim 2, wherein the second transducer means is electrically connected by a flexible connector to audio circuitry in the main body.

4. A portable radio telephone as claimed in claim 3, wherein the flexible connector comprises a printed circuit on a flexible substrate.

5. A portable radio telephone as claimed in claim 4, wherein the first transducer means is an earphone and the second transducer means is a microphone.

6. A portable radio telephone as claimed in claim 1, wherein the extending portion accommodates a battery for powering the telephone.

7. A portable telephone as claimed in claim 1, wherein movement of the extending portion to the second position automatically produces an off-hook condition in the telephone.

8. A portable radio telephone as claimed in claim 1, wherein movement of the extending portion from the second position automatically produces an on-hook condition in the telephone.

9. A portable radio telephone as claimed in claim 1, further comprising means for driving the extending portion between the first and second positions, and a button or key on the housing for actuating the driving means.

10. A portable radio telephone as claimed in claim 1, including means which bias the extending portion towards the second position, releasable locking means being included for retaining the extending portion in the first position.

11. A portable radio telephone as claimed in claim 1, wherein the window is in the form of a recess in the extending portion.

12. A portable cellular telephone comprising:
a first portion having electronic circuitry therein; and
a second portion longitudinally slidingly mounted to the first portion having a microphone and a battery therein, the battery being located in the second portion such that the center of gravity of the telephone is substantially changed when the second portion is moved relative to the first portion, the second portion having a window adapted to be located over keys on the first portion.

13. A portable telephone as in claim 12 wherein the second portion has a section that is adapted to surround a portion of the first portion.

14. A portable telephone comprising:
electronic circuitry;
a housing surrounding the electronic circuitry, the housing having a main body section and a movable section, the movable section being slidingly mounted to the main body section along a linear path and having a microphone therein, the movable section also having a substantially U-shaped cut-out window adapted to be located over keys on the main body section; and
means for automatically moving the movable section from a retracted position to an extended position.

15. A telephone as in claim 14 wherein the means for automatically moving includes an elongate coil spring.

16. A telephone as in claim 14 wherein the means for automatically moving includes a motor.

17. A telephone as in claim 14 wherein the main body section has an interior channel adapted to have a substantial portion of the movable section located therein in the retracted position.

18. A telephone as in claim 14 further comprising means for automatically switching from an on-hook condition to an off-hook condition upon movement of the movable section to its fully extended position.

19. A portable radio telephone comprising:
transceiver means;
a housing enclosing said transceiver means, said housing having a main body and an extending portion mounted for longitudinal slidable movement between a first position at which the main body and the extending portion are in a substantial overlapping relationship and a second position at which the extending portion extends from the main body;
first transducer means present in the main body;
second transducer means present in the extending portion; and
a keypad which comprises a plurality of keys which can be selectively actuated for operating the telephone, wherein the main body comprises a window through which at least one of the keys is accessible when the extending portion is in the first position.

20. A portable radio telephone as claimed in claim 19, wherein the main body of the housing encloses the transceiver means.

21. A portable radio telephone as claimed in claim 19, wherein the second transducer means is electrically connected by a flexible connector to audio circuitry in the main body.

22. A portable radio telephone as claimed in claim 21, wherein the flexible connector comprises a printed circuit on a flexible substrate.

23. A portable radio telephone as claimed in claim 22, wherein the first transducer means is an earphone and the second transducer means in a microphone.

24. A portable radio telephone as claimed in claim 19, wherein the extending portion accommodates a battery for powering the telephone.

25. A portable telephone as claimed in claim 19, wherein movement of the extending portion to the second position automatically produces an off-hook condition in the telephone.

26. A portable radio telephone as claimed in claim 19, wherein movement of the extending portion from the second position automatically produces an on-hook condition in the telephone.

27. A portable radio telephone as claimed in claim 19, further comprising means for driving the extending portion between the first and second positions, and means on the housing for actuating the driving means.

28. A portable radio telephone as claimed in claim 19, including means which bias the extending portion towards the second position, releasable locking means being included for retaining the extending portion in the first position.

* * * * *